(12) United States Patent
Alexander et al.

(10) Patent No.: US 10,773,732 B1
(45) Date of Patent: Sep. 15, 2020

(54) SYSTEMS AND METHODS FOR INTERFACING WITH AN OCCUPANT

(71) Applicant: Direct Current Capital LLC, Wilmington, DE (US)

(72) Inventors: Chip J. Alexander, Belmont, CA (US); Miao Sun, Mountain View, CA (US)

( * ) Notice: Subject to any disclaimer, the term of this patent is extended or adjusted under 35 U.S.C. 154(b) by 0 days.

(21) Appl. No.: 16/455,279

(22) Filed: Jun. 27, 2019

Related U.S. Application Data

(60) Provisional application No. 62/690,860, filed on Jun. 27, 2018.

(51) Int. Cl.
*B60Q 9/00* (2006.01)
*B60W 50/14* (2020.01)
(Continued)

(52) U.S. Cl.
CPC ............ *B60W 50/14* (2013.01); *B60W 40/04* (2013.01); *G05D 1/0088* (2013.01);
(Continued)

(58) Field of Classification Search
CPC ......... G05D 1/0088; G05D 2201/0213; G05D 1/0274; G05D 1/0212; G05D 1/024; G05D 1/0257; G05D 1/0238; G05D 1/0246; G05D 1/0011; G05D 1/0055; G05D 1/0223; G05D 1/0278; G05D 1/0038; G05D 1/0061; G05D 1/0214; G05D 1/0225; G05D 1/0242;
(Continued)

(56) References Cited

U.S. PATENT DOCUMENTS

2014/0026088 A1   1/2014  Monte
2016/0229414 A1*  8/2016  Desnoyer .............. B60W 50/14
(Continued)

FOREIGN PATENT DOCUMENTS

EP          2150034       2/2010
EP          1921421       5/2018
WO      WO 2014/139821    9/2014

OTHER PUBLICATIONS

Linder, Brad, "Google introduces Android Auto," Jun. 25, 2014, https://liliputing.com/2014/06/google-introduces-android-auto.html, accessed Mar. 21, 2018.
(Continued)

*Primary Examiner* — Daniel Previl
(74) *Attorney, Agent, or Firm* — Polsinelli PC (57) ABSTRACT

Systems and methods communicate an intent of an autonomous vehicle externally. In one implementation, scan data of a field around a travel path of an autonomous vehicle is obtained. The scan data is captured using at least one sensor. An object in the field around the travel path is determined from the scan data. The object is determined to be mutable or immutable. A navigation condition associated with the object is determined based on whether the object is mutable or immutable. The navigation condition is correlated to a portion of the travel path. Control operation(s) of the autonomous vehicle is determined for the portion of the travel path in response to the navigation condition. A representation link between the control operation(s) of the autonomous vehicle and the object is generated. A representation of the field around the travel path is rendered and includes the representation link.

20 Claims, 5 Drawing Sheets

(51) Int. Cl.
*B60W 40/04* (2006.01)
*G05D 1/00* (2006.01)
*G05D 1/02* (2020.01)

(52) U.S. Cl.
CPC ..... *G05D 1/0212* (2013.01); *B60W 2050/146* (2013.01); *B60W 2555/20* (2020.02); *B60W 2555/60* (2020.02); *G05D 2201/0213* (2013.01)

(58) Field of Classification Search
CPC .. G05D 1/0251; G05D 1/0253; G05D 1/0255; G05D 1/027; G05D 1/0272; G05D 1/028; G05D 1/0291; G05D 1/0231; G05D 1/0276; G05D 2201/0211; B60W 30/09; B60W 10/20; B60W 30/0956; B60W 40/08; B60W 10/18; B60W 2040/0809; B60W 2420/42; B60W 2420/52; B60W 2554/00; B60W 30/085; B60W 50/0098; B60W 10/04; B60W 10/22; B60W 2050/046; B60W 2520/10; B60W 2552/35; B60W 2554/408; B60W 2555/60; B60W 2556/50; B60W 30/00; B60W 30/0953; B60W 30/12; B60W 30/143; B60W 30/146; B60W 30/162; B60W 30/18163; B60W 50/087; B60W 60/001; B60W 60/0011; B60W 60/0016; B60W 60/0017; G01C 21/3407; G01C 21/32; G01C 21/3602; G01C 21/34; G01C 21/3415; G01C 21/3461; B60K 35/00; B60K 2370/158; B60K 2370/178; B60K 2370/52; B60K 2370/55; B60K 2370/589; B60K 2370/73; B60K 37/06; B60G 17/0165; B60G 17/019; B60G 17/0195; B60G 17/016; B60G 2400/05; B60G 2600/182; B60G 2800/012; B60G 2800/014; B60G 2800/016; B60G 99/002; B60G 17/0162; B60G 17/0182; B60G 2204/62; B60G 2400/821; B60G 2400/823; B60G 2400/824; B60G 2400/8422; B60G 2400/8424; B60G 2401/142; B60G 2401/16; B60G 2401/174; B60G 2500/10; B60G 2500/20; G06K 9/00805; G06K 9/00785; G06K 9/00342; G06K 9/00791; G06K 9/00798; G06K 9/00818; G06K 9/6202; G06K 9/6289; G06Q 10/10; G06Q 20/3224; G06Q 30/02; G06Q 30/0241; G06Q 10/087; G06Q 50/28; G06Q 30/0265; G06Q 50/01; G06T 2207/30236; G06T 2207/10016; G06T 7/20; G06T 7/73; G06T 2207/10024; G06T 2207/10028; G06T 2207/20212; G06T 2207/30241; G06T 2207/30261; G06T 7/11; G06T 7/246; G06T 7/248; G06T 7/254; G06T 7/74; G06T 7/80; G08G 1/166; G08G 1/13; G08G 1/207; G08G 1/0112; G08G 1/04; G08G 1/096708; A61B 5/4023; B60N 2002/0268; B60N 2/0244; B60N 2/14; B60N 2/501; B60N 2/0276; B60R 16/0231; B60R 25/01; B60R 2021/01211; B60R 21/01; B60R 21/0134; B60R 21/16; B60R 21/34; B60R 22/46; G05B 19/41895; G05B 13/027; G06N 3/04; G06N 3/08; G06N 20/00; H04N 5/23258; H04N 5/23267; B25J 5/007; B25J 9/0003; G01S 17/42; G01S 17/86; G01S 17/931; G01S 7/4802; G06F 16/2379; G06F 16/287; G06F 16/29; G06F 21/6254; H04W 4/027; H04W 4/44; Y10S 901/01; Y10S 901/47; Y10S 901/50
USPC ........... 340/438, 988, 901–903, 905, 825.23, 340/7.51, 815.69
See application file for complete search history.

(56) References Cited

U.S. PATENT DOCUMENTS

| | | | |
|---|---|---|---|
| 2017/0168501 A1* | 6/2017 | Ogura | G05D 1/0038 |
| 2017/0176192 A1* | 6/2017 | Cardoso de Moura | G01C 21/3461 |
| 2018/0218606 A1* | 8/2018 | Michalakis | G06K 9/00805 |
| 2018/0283896 A1* | 10/2018 | Piemonte | G01C 21/3664 |
| 2019/0329790 A1* | 10/2019 | Nandakumar | G06N 3/084 |

OTHER PUBLICATIONS

Thomas, Kevin, "Android Auto: Everything you need to know," Feb. 3, 2015, https://3g.co.uk/guides/android-auto-everything-you-need-to-know, accessed Mar. 21, 2018.

"The Near Future of In-Car HMI," ustwo Auto, Jul. 14, 2014, http://ustwo.com/blog/the-near-future-of-in-car-hmi/, accessed Mar. 21, 2018.

* cited by examiner

FIG. 5

SYSTEMS AND METHODS FOR INTERFACING WITH AN OCCUPANT

CROSS-REFERENCE TO RELATED APPLICATIONS

The present application claims benefit of priority to U.S. Provisional Patent Application No. 62/690,860, entitled "Method for Interfacing with an Occupant of an Autonomous Vehicle" and filed on Jun. 27, 2018, which is specifically incorporated by reference herein in its entirety.

FIELD

Aspects of the present disclosure relate to systems and methods for interfacing with an occupant and more particularly to a user interface providing information relating to operation of an autonomous machine.

BACKGROUND

Autonomous machines transporting one or more occupants, including without limitation, automobiles, terrestrial vehicles, aerial vehicles, aerospace vehicles, submersible vehicles, and/or the like, generally operate within their respective environment with limited or no input or control by the occupants. However, the lack of operational engagement between the occupant and the autonomous machine may result in the occupants lacking knowledge of future actions or an understanding of a basis of autonomous decisions taken by the autonomous machine. Such a lack of knowledge and understanding may unnecessarily decrease a confidence of the occupants in the operation of the autonomous machine or otherwise make the occupants uneasy. It is with these observations in mind, among others, that various aspects of the present disclosure were conceived and developed.

SUMMARY

Implementations described and claimed herein address the foregoing problems by providing systems and methods for communicating an intent of an autonomous vehicle to an occupant of the autonomous vehicle. In one implementation, scan data of a field around a travel path along a route of an autonomous vehicle is obtained. The scan data is captured using at least one sensor. An object in the field around the travel path is determined from the scan data. The object is determined to be mutable or immutable. A navigation condition associated with the object is determined based on whether the object is mutable or immutable. The navigation condition is correlated to a portion of the travel path. Control operation(s) of the autonomous vehicle is determined for the portion of the travel path in response to the navigation condition. A representation link between the control operation(s) of the autonomous vehicle and the object is generated. A representation of the field around the travel path is rendered. The representation includes the representation link and is presented to an interior of the autonomous vehicle using a presentation system.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Aspects of the presently disclosed technology relate to systems and method for interfacing between an occupant and an autonomous machine, such as an autonomous vehicle. Generally, an interfacing system generates a user interface for communicating an intent of the autonomous machine to a user, such as an occupant of the autonomous machine. In one aspect, scan data of a field around a travel path of the autonomous vehicle is continuously captured as an autonomous vehicle moves along the travel path. Object(s) in the field around the travel path are detected from the scan data. Based on whether the object(s) are determined to be mutable or immutable, a navigation condition associated with each of the objects is determined. The navigation condition is correlated to a portion of the travel path, and a control operation(s) of the autonomous vehicle is determined in response to the navigation condition. To communicate the intent of the autonomous vehicle for addressing the object(s) in the field around the travel path, a representation link between the control operation(s) of the autonomous vehicle and each object is generated. The representation link may include visual, audial, and/or tactile features communicating a connection between the decisions and actions of the autonomous vehicle and the detection of the object(s). A representation of the field of the travel path including the representation link is rendered and presented to the occupant.

The various systems and methods disclosed herein generally provide for interfacing between an occupant and an autonomous machine. The example implementations discussed herein reference rendering a representation of a field around a travel path of an autonomous vehicle to communicate an intent of an autonomous vehicle, including underlying decisions and actions, to occupants of the autonomous vehicle. However, it will be appreciated by those skilled in the art that the presently disclosed technology is application in other human machine interface contexts and to other manned and unmanned autonomous machines, including, without limitation, terrestrial vehicles, aerial vehicles, aerospace vehicles, submersible vehicles, and/or the like. The presently disclosed technology may be further applicable to other types of machines and user devices, such as a personal computer, workstation, mobile device, or other computing devices.

Figure 1:
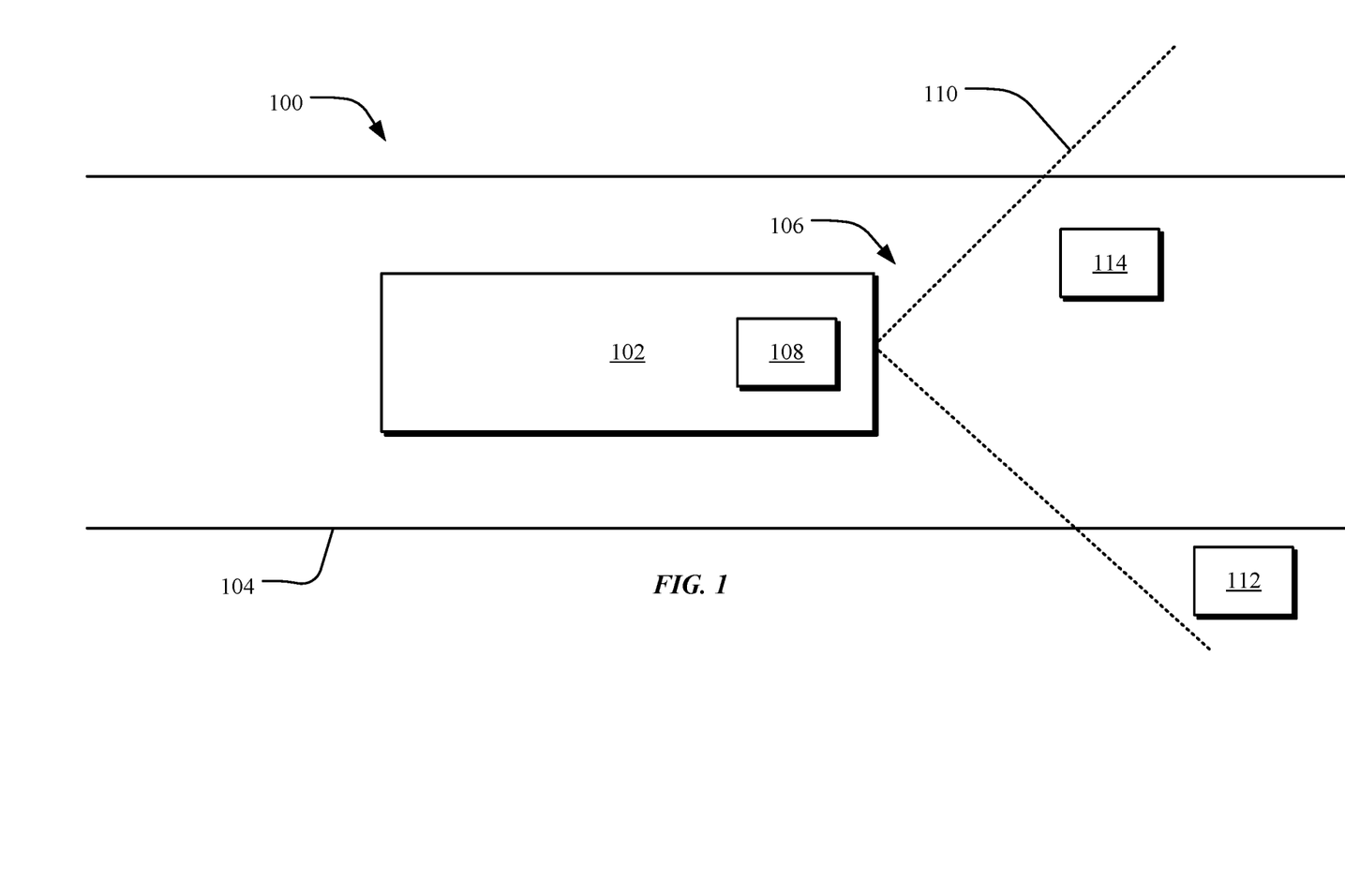
FIG. 1 is a diagram of an example environment for communicating an intent of an autonomous vehicle to an occupant of the autonomous vehicle.
Figure 2:
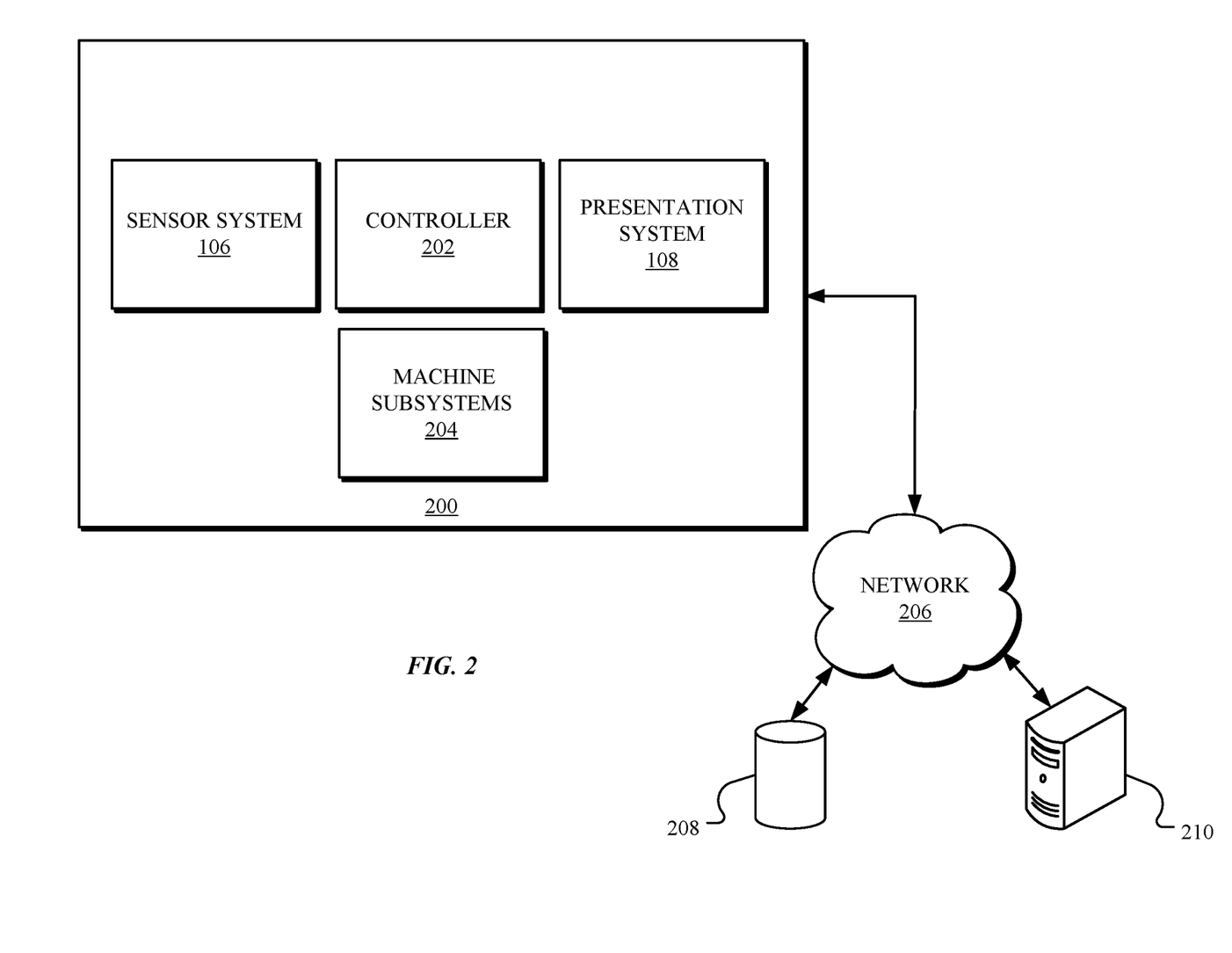
FIG. 2 is a diagram of an example interfacing system for interfacing with an occupant of an autonomous vehicle.

For a detailed description of an example environment 100 for communicating an intent of an autonomous vehicle 102 to an occupant of the autonomous vehicle 102 using an interfacing system 200, reference is made to FIGS. 1-2. In one implementation, the autonomous vehicle 102 is autonomously navigating along a route and moving on a travel path 104 along the route. The autonomous vehicle 102 is capable of operating to move along the travel path 104 with limited input from occupants within an interior of the autonomous vehicle 102. Stated differently, rather than the user having an operational engagement with the autonomous vehicle 102 to control its actions, the occupant may simply input a destination point or other instruction and the autonomous vehicle 102 transports the occupant through a series of autonomous decisions. As a result, the occupant may not have knowledge of actions planned or being executed by the autonomous vehicle 102 or a basis of autonomous decisions underlying those actions. For example, the occupant may not know whether objects around the travel path 104 are detected by the autonomous vehicle 102 and/or that the autonomous vehicle 102 is responding to the presence of such object properly.

To facilitate communication of the intent of the autonomous vehicle 102 in such contexts, the interfacing system 200 of the autonomous vehicle 102 includes a sensor system 106, a vehicle controller 202, and a presentation system 108. The sensor system 106 may be mounted on or otherwise deployed in the autonomous vehicle 102, and the presentation system 108 may be mounted or otherwise deployed in an interior of the autonomous vehicle 102 to communicate to the occupant(s). In some implementations, the presentation system 108 may be part of a mobile device carried by the occupant in communication with the vehicle controller 202 for communicating to users, such as current, past, and/or future occupants.

In one implementation, the sensor system 106 scans a field 110 around the travel path 104 of the autonomous vehicle 102. While the field 110 is depicted in one area relative to the autonomous vehicle 102. It will be appreciated that the field 110 may correspond to other areas, multiple areas, and/or a 360 degree area. One or more objects within the field 110 that have the potential to impact the navigation of the autonomous vehicle 102 along the travel path 104 are detected based on captured scan data. For example, immutable objects, such as immutable object 112, that are stationary within the field 110, and mutable objects, such as mutable object 114, that are or may be moving within the field 110, are detected. More particularly, the sensor system 106 includes at least one sensor configured to capture scan data of the field 110. Object(s) in the field 110 around the travel path 104, such as the immutable object 112 and the mutable object 114, are detected from the scan data. The vehicle controller 202 determines whether the objects 112 and 114 are immutable or mutable. In one implementation, the vehicle controller 202 determines whether the objects 112 and 114 are mutable or immutable based on an object type and a motion of the object. The object type may be determined based on a comparison of the object to a plurality of object profiles.

Based on whether the objects 112 and 114 are determined to be mutable or immutable, the vehicle controller 202 determines a navigation condition associated with each of the objects 112 and 114. The navigation condition generally corresponds to an impact of objects or an associated aspect of the field 110 on the navigation of the autonomous vehicle 102. For example, the immutable object 112, such as a school zone sign, may specify a traffic regulation mandating a vehicle control parameter impacting navigation of the autonomous vehicle 102, such as a reduced speed within an associate school zone. As another example, the mutable object 114 may have a trajectory that is estimated to intersect with the travel path 104 of the autonomous vehicle 102, thereby impacting the navigation of the autonomous vehicle 102. The navigation condition is correlated to a portion of the travel path 104, and one or more control operations of the autonomous vehicle 102 are determined in response to the navigation condition. In the example where the immutable object 112 is a school zone sign, the vehicle controller 202 correlates the traffic regulations pertaining to school zones to the portion of the travel path 104 within the school zone and determines control operation(s) for complying with the traffic regulations, such as braking or otherwise reducing speed. Similarly, the vehicle controller 202 correlates the portion of the travel path 104 at which the mutable object 114 is estimated to intersect with the autonomous vehicle 102 with the mutable object 114 and determines control operation(s) of the autonomous vehicle 102 for avoiding intersection with the mutable object 114.

To communicate the intent of the autonomous vehicle 102 for addressing the object 112 and 114 in the field 110 around the travel path, the vehicle controller 202 generates a representation link between the control operation(s) of the autonomous vehicle 102 and each object 112 and 114. The representation link may include visual, audial, and/or tactile features communicating a connection between the decisions and actions of the autonomous vehicle 102 and the detection of the object 112 and 114. For example, the representation link may include color coding, bounding boxes, highlighting, and/or other graphic or visual representations linking the object 112 and 114 to an action of the autonomous vehicle 102. A representation of the field of the travel path including the representation link is rendered, and the presentation system 108 presents the representation to the occupant within the autonomous vehicle 102. In one implementation, prior to or otherwise in connection with communicating the representation link to the occupant using the presentation system 108, the vehicle controller 202 communicates with one or more subsystems 204 of the autonomous vehicle 102 controlling various systems of the autonomous vehicle 102 to autonomously execute the control operation(s) of the autonomous vehicle 102 for the portion of the travel path 104.

In some cases, the vehicle controller 202 may obtain navigation data, object profiles, scan data, traffic regulation data, known traffic regulations, weather data, and/or other raw or processed data over a network 206. In one implementation, the network 206 is used by one or more computing or data storage devices, including one or more databases 208, for providing or otherwise accessing relevant information for navigating the autonomous vehicle, detecting objects in the field 110, determining navigation conditions, determining control operations for the autonomous vehicle 102, generating representation links, and/or rendering representations of the field 110. The presentation system 108 may be deployed in a mobile device and in communication with the vehicle controller 202 over the network 206. A server 210 may also host a website or an application that users visit to access information stored in the databases 208 and/or for accessing or interacting with the interfacing system 200. The server 210 may be one single server, a plurality of servers with each such server being a physical server or a virtual machine, or a collection of both physical servers and virtual machines. In another implementation, a cloud hosts one or more network components. The vehicle controller 202, the server 210, the sensor system 106, the presentation system 108, and other resources, such as the database 208 or user devices, connected to the network 206 may access one or more other servers or resources for access to one or more websites, information, web services interfaces, autonomous vehicles, and/or other services or information. The server 210 may also host a search engine for accessing and modifying such information.

In one implementation, the autonomous vehicle 102 autonomously navigates along the travel path 104 according to a first set of navigational parameters, while the sensor system 104 records a sequence of optical scans of the field 110 around the autonomous vehicle 102. The sequence of optical scans is scanned for immutable objects (e.g., traffic signs) and mutable objects, and the vehicle controller 202 renders a representation of the field 110 for presentation using the presentation system 108 based on the sequence of optical scans. For example, the immutable object 112 may be a crosswalk sign, and the mutable object 114 may be a pedestrian crossing in connection with the crosswalk sign.

In response to detecting the crosswalk sign and the pedestrian in the sequence of optical scans, the sign and the pedestrian may be highlighted in the representation of the field 110. In one implementation, the sign is validated to determine whether it is currently applicable to the navigation of the autonomous vehicle 102. A warning window rendered in the representation presented with the presentation system 108 (e.g., presented on an interior display) may be populated with an icon indicating that the sign is currently valid. The vehicle controller 202 communicates with the vehicle subsystems 204 to modify navigation of the autonomous vehicle according to traffic regulations regarding the crosswalk sign and the pedestrian. In response to passing the sign, the icon may be removed from the warning window rendered, and autonomous navigation may be resumed according to the first set of navigational parameters.

The autonomous vehicle 102 scans the field 110 around the autonomous vehicle 102 and detects immutable objects 112 (e.g., lane markers, traffic signs) in the field 110 that define navigational regulations along portions of the travel path 104 traversed by the autonomous vehicle 102. The autonomous vehicle 102 further detects any mutable objects 114 (e.g., other vehicles, cyclists, pedestrians, and other movable objects) that affect the route generation and navigational actions of the autonomous vehicle. A representation of the field 110 may be presented using the presentation system 108, for example on an interior display mounted within an interior of the autonomous vehicle 102 and visually accessible to an occupant. The mutable object(s) 114 and the immutable objects 112 may be visually demarcated in the representation of the field 110 rendered on the display, with selectively rendered contextual prompts or notifications related to navigational and other actions executed by the autonomous vehicle 102 based on the mutable and immutable objects 112 and 114.

In one implementation, the autonomous vehicle 102 communicates its interpretation of its surrounding field 110— including both immutable and mutable objects 112 and 114 near or otherwise affecting the autonomous vehicle 102. The autonomous vehicle 102 further communicates the relevance of the objects 112 and 114 even if no longer in view and the effects of the objects 112 and 114 on autonomous navigation of the autonomous vehicle 102. As such, the autonomous vehicle 102 increases autonomous vehicle operation transparency, enabling the occupant to quickly verify that the autonomous vehicle is operating as expected and with sufficient caution, thereby reducing occupant anxiety and increasing trust in the autonomous operation of the autonomous vehicle 102.

The interfacing system 200 may render the representation of the field 110 in various manners. For example, a 2D or 3D representation of the field 110 may be rendered and presented using the presentation system 108, with the representation being populated with renderings of the detected objects and representation links. The mutable object 114 may be displayed, for example, with bounding boxes around current and potential future locations of the mutable object 114 based on the set of trajectories. As described herein, the autonomous vehicle 102 may modify or otherwise update its trajectory based on the mutable and immutable objects (e.g., object 112 and 114) to avoid collision with a pedestrian or other vehicle while following speed and lane limitations defined by local speed limit signs and lane markers in the field. While executing this trajectory, the autonomous vehicle 102 renders the updated trajectory on the interior display and annotates the trajectory and/or bounding boxes around other objects represented on the interior display in order to visually communicate a link between control operations executed by the autonomous vehicle 102 (e.g., braking, accelerating, turning, changing lanes) and the other detected objects.

In one implementation, the autonomous vehicle 102 can: detect another vehicle or a pedestrian entering the road just ahead of the autonomous vehicle 102; render a bounding box around this vehicle or pedestrian represented on the interior display; calculate a new trajectory around this vehicle or pedestrian; and render this new trajectory (and the previous trajectory) on the interior display while executing this new trajectory to avoid the vehicle or pedestrian, such as by rapidly slowing ahead of or swerving around the vehicle or pedestrian. This rapid change in speed or direction may unsettle the occupant inside the autonomous vehicle 102 and prompt the user to look to the display for feedback or information regarding this navigational action by the autonomous vehicle 102. By rendering such content on the interior display in real-time, including the autonomous vehicle 102 perception of the field 110 and intended trajectory, the autonomous vehicle 102 provides the occupant access to information in real time, which may enhance the occupant experience and/or improve confidence in the autonomous vehicle 102.

In one implementation, while the autonomous vehicle 102 autonomously traverses a planned route, the autonomous vehicle 102 extracts traffic regulation data from the scan data that is associated with a detected traffic sign or similar immutable object. The vehicle controller 202 interprets a regulation (e.g., a speed limit) or a warning (e.g., slippery when wet, school zone, railroad crossing) represented by this traffic sign, and highlights the traffic sign in a representation of the field 110 rendered on the interior display of the presentation system 108, for example. Alternatively or additionally, a traffic sign and warning window rendered on the interior display may be populated with a representation (e.g., an icon) of the detected traffic sign. The autonomous vehicle 102 may communicate context of the traffic sign to the occupant via the interior display, including how the autonomous vehicle 102 is modifying its speed, lane, path planning, and/or other control operation based on the traffic sign in the context of other objects detected in the field 110 around the autonomous vehicle 102.

For example, in response to identifying the immutable object 112 as a school zone sign (or detecting an approaching known school zone), the autonomous vehicle 102 may:

scan the field 110 around the autonomous vehicle 102 for children, pedestrians, or other mutable objects using the sensor system 106; reduce its speed responsive to detecting a child or pedestrian; visually indicate on the interior display of the presentation system 108 that the autonomous vehicle 102 has detected both the school zone sign and the mutable object 114, which may be identified as a child; and render a notification linking the reduced speed of the autonomous vehicle 102 to the school zone sign and the child on the interior display.

In another example, in response to determining that the immutable object 112 is a yield sign, the autonomous vehicle 102 visually indicates that the autonomous vehicle 102 has detected the yield sign and scans the field 110 around the autonomous vehicle 102 for another vehicle approaching the autonomous vehicle 102. If another vehicle is not approaching, the presentation system 108 may indicate that the autonomous vehicle 102 has right of way, clear the yield sign from the representation, and maintain its current operation. If another vehicle is approaching, the autonomous vehicle 102 may slow for the approaching vehicle and render a notification on the interior display linking the speed reduction to the approaching vehicle and the yield sign.

The autonomous vehicle 102 generally provides a real-time representation of the perception of the autonomous vehicle 102 of the field 110, including the mutable and immutable objects 112 and 114 that may affect navigation or operation of the autonomous vehicle. As the autonomous vehicle 102 autonomously navigates on the travel path 104 along the route, the sensor system 106 continuously, regularly, intermittently, or upon prompt captures scan data of the field 110.

The sensor system 106 includes a suite of one or more sensors configured to collect information about the environment of the autonomous vehicle 102. In one implementation, the sensor system 106 includes a set of 360° LIDAR sensors arranged on the autonomous vehicle 102. For example, one LIDAR sensor may be arranged at the front of the autonomous vehicle 102, and a second LIDAR sensor may be arranged at the rear of the autonomous vehicle 102. In another example, a cluster of LIDAR sensors may be arranged on the roof of the autonomous vehicle 102. Each LIDAR sensor can output one three-dimensional distance map (or depth image)—such as in the form of a 3D point cloud representing distances between the LIDAR sensor and external surface within the field of view of the LIDAR sensor—per rotation of the LIDAR sensor (i.e., once per scan cycle). The sensor system 106 may additionally or alternatively include: a set of infrared emitters configured to project structured light into the field 110 near the autonomous vehicle 102; a set of infrared detectors (e.g., infrared cameras); and/or the like.

In one implementation, the sensor system 106 includes one or more color cameras facing outwardly from the front, rear, left lateral side, right lateral, and/or other locations of the autonomous vehicle 102. Each camera can output a video feed containing a sequence of digital photographic images (or "frames"), such as at a rate of 20 Hz. The sensor system 106 may alternatively or additionally include a set of infrared proximity sensors arranged along the perimeter of the base of the autonomous vehicle 102 and configured to output signals corresponding to proximity of objects within one meter or other distance of the autonomous vehicle 102.

The sensor system 106, the vehicle controller 202, and/or other computing units may fuse data streams from the LIDAR sensor(s), the color camera(s), the proximity sensor(s), and/or other sensors into one optical scan of the field 110 around the autonomous vehicle—such as in the form of a 3D color map or 3D point cloud of roads, sidewalks, vehicles, pedestrians, and/or other features and objects in the field 110 around the autonomous vehicle 102—per scan cycle. The sensor system 102, the vehicle controller 202, or other computing unit may similarly transform images output by the infrared detector(s) into a depth map of the field 110. In some implementations, the autonomous vehicle 102 collects scan data and other data broadcast by other vehicles and/or static sensor systems over the network 206 and incorporates the collected data into an optical scan to determine a state and context of the field 110 to elect subsequent control operations.

The interfacing system 200 may utilize a navigation map, localization map, and/or the like in determining control operations, navigation, and other autonomous decisions. The maps may be stored in local memory of the interfacing system 200 and/or acquired over the network 206. The navigation map defines a route for execution by the autonomous vehicle 102, and the localization map is used to determine a location of the autonomous vehicle 102 in real space. In one implementation, the vehicle controller 202: determines the location of the autonomous vehicle 102 in real space based on sensor data collected from the sensor system 106 and the localization map; determines the context of the field 110 around the autonomous vehicle 102 based on these sensor data; determines a control operation (e.g., a navigational decision) based on the context of the field 110 around the autonomous vehicle 102, the real location of the autonomous vehicle (e.g., determined using the localization map), and the navigation map. The vehicle controller 202 may implement a deep learning and/or artificial intelligence model in generating these determinations. The control operations are autonomously executed using the subsystems 204 within the vehicle (e.g., accelerator, brake, and steering actuators). In one implementation, the vehicle controller 202 compares features extracted from the optical scan to like features represented in the localization map to determine the geospatial location and orientation of the autonomous vehicle 102 in real space. The vehicle controller 202 uses this information to elect a control operation accordingly.

The interfacing system 200 may further implement a perception model, including, without limitation, integrated or discrete vehicle, pedestrian, traffic sign, traffic signal, and lane marker detection models, to detect and identify mutable and immutable objects in the field 110. The vehicle controller 202 may implement a navigation or path planning model (e.g., in the form of a convolutional neural network) to elect acceleration, braking, turning actions and/or other control operations based on these mutable and immutable objects and the route of the autonomous vehicle 102.

It will be appreciated that the autonomous vehicle 102 can include any other types of sensors and can implement any other scanning, signal processing, and autonomous navigation techniques or models to determine its geospatial position and orientation, to perceive objects in its vicinity, and to elect control operations based on sensor data collected through these sensors.

The presentation system 108 may be deployed in the interior of the autonomous vehicle 102, form part of a mobile device of an occupant in the interior of the autonomous vehicle 102, and/or the like. The presentation system 108 may have various input and output devices. In one implementation, the presentation system 108 includes an interior display visible to an occupant within the passenger compartment of the autonomous vehicle 102. For example, the presentation system 108 may include an LED-backlit LCD display or an OLED display arranged inside the passenger compartment, such as on the dashboard or integrated into a seat headrest, for example.

During operation, in one implementation, the autonomous vehicle 102 records scan data of the field 110 around the autonomous vehicle, such as in the form of 3D LIDAR frames or 2D color images, and renders a representation in the form of a 2D projection of the scan data on the interior display of the presentation system 108. The representation may be a bird's-eye view of the autonomous vehicle 102 and surrounding field 110. The autonomous vehicle 102 may be approximately centered on the interior display. The representation may further include left, forward, and side passenger views rendered across the interior display. The autonomous vehicle 102 may implement the perception model and the navigation model to identify objects (e.g., the objects 112 and 114) in the field 110, highlight or annotate representations of the objects rendered on the interior display, regularly recalculate a trajectory of the autonomous vehicle, and to render the updated trajectory on the interior display.

In one implementation, when rendering a representation of the field 110 around the autonomous vehicle, the interfacing system 200 highlight the mutable and/or immutable objects 112 and 114 affecting the navigation of the autonomous vehicle 102 or otherwise triggers the autonomous vehicle to execute control operations, such as a change in accelerator, brake, or steering position, using the representation link. For example, the interfacing system 200 may render bounding boxes around other vehicles, pedestrian, cyclists, traffic cones, and other mutable objects near the autonomous vehicle 102 for depiction on the interior display. In another example, the interfacing system 200 renders the field 110 around the autonomous vehicle generally in monochromatic or grayscale but renders relevant mutable objects in full color. The interfacing system 200 may similarly highlight traffic signs, traffic signals, lane markers, curbs, and other immutable objects near the autonomous vehicle 102 for depiction on the interior display.

The interfacing system 200 may also render a traffic sign and warning window on the interior display—such as in a top-left corner of the interior display—and populate this window with icons representing current traffic signs, speed limits, and other regulations and guidance current for the portion of the travel path 104 occupied by the autonomous vehicle 102, as described herein. As the autonomous vehicle 102 detects new objects in the field 110, identifies new traffic signs or other immutable objects, and passes previously-detected objects and road signs while autonomously traversing a planned route, the interfacing system 200 can regularly update the interior display of the presentation system 108 to reflect a new set of valid traffic signs and objects affecting the navigation and path planning.

In one implementation, the interfacing system 200 presents, updates, and/or animates content rendered on a fixed interior display of the presentation system 108, while transporting an occupant from a pickup location to a drop-off location (e.g., in a rideshare context or other context). However, the interfacing system 200 can additionally or alternatively serve such content to a mobile computing device (e.g., smartphone, tablet) of the occupant via the network 206 (e.g., directly via a local ad hoc wireless network or indirectly through a remote computer system). The mobile computing device can then render the content for consumption by the user, such as within a web browser or native rideshare application.

As described herein, the interfacing system 200 may utilize a localization map. The localization map may be annotated with: locations of traffic signs; laws, rules, prompts, guidance, and other known traffic regulations represented by these traffic signs; and road segments in which the known traffic regulations apply. Throughout operation, the vehicle controller 202 queries the localization map for georeferenced traffic signs, zones, and/or other known traffic regulations for a portion of the travel path 104 that the autonomous vehicle 102 is currently occupying or approaching. The interfacing system 200 highlights an area of the field 110 rendered on the interior display of the presentation system 108 with a location of an upcoming traffic sign predicted by the localization map and renders an icon (or other textual or visual content) representative of this traffic sign on the interior display (e.g., in the traffic sign and warning window), even if the traffic sign is not yet visible or even if its content is not yet discernible by the autonomous vehicle 102. The autonomous vehicle can then execute methods and techniques described herein to highlight the traffic sign, verify validity of the traffic sign, and autonomously navigate along the portion of the travel path 104 impacted according to the traffic regulations associated with the traffic sign.

However, if the autonomous vehicle 102 approaches and then passes a georeferenced location of a traffic sign indicated in the localization map but fails to detect this traffic sign at or near its expected location, the interfacing system 200 can: preserve a bounding box around the expected location of the traffic sign in the representation of the field 110 rendered on the interior display; render a type, navigational regulation, guidance, or other related content from the expected traffic sign on the interior display; and render a notification that the autonomous vehicle 102 expected the traffic sign in this location and that the autonomous vehicle 102 will continue to operate as though the traffic sign were present. Accordingly, the interfacing system 200 can populate the traffic sign and warning window with a representation of the expected traffic sign. The interfacing system 200 can also send scan data recorded by the autonomous vehicle while passing the expected location of the traffic sign to a remote computer system, where removal of the traffic sign is verified and the localization map is updated. The remote computer system may serve localization map updates over the network 206 to autonomous vehicles operating in the geographic region accordingly.

For example, the autonomous vehicle 102 can be loaded with a localization map including a layer defining geolocations of stop signs within a geographic region. If a recent automotive accident, inclement weather, or road construction resulted in failure or inadvertent removal of a stop sign within this geographic region and the autonomous vehicle 102 is approaching the geospatial location of this failed or removed stop sign, the interfacing system 200 predicts a presence of the stop sign based on stop signs locations stored in the localization map. The interfacing system 200 visually indicates the location and regulation (i.e., "stop") specified by the stop sign in the representation of the field 110 rendered on the interior display of the presentation system 108 as the autonomous vehicle 102 approaches this geospatial location. From scan data, the interfacing system 200 may determine that the stop sign is not present at the expected geospatial location and render a notification on the interior display that the autonomous vehicle 102 nonetheless intends to stop at the expected geospatial location of the stop sign. The interfacing system 200 populates a traffic sign and warning window rendered on the interior display with a representation of a stop sign, and the autonomously vehicle 102 automatically slows and then stops at the location of the stop sign, even though the stop sign is not currently present before resuming navigation through this intersection.

In another example, lane markers have been removed from the portion of the travel path 104 currently occupied by the autonomous vehicle 102, such as during recent construction. In this case, the interfacing system 200 may project georeferenced lane markers represented in the localization map onto the field 110 around the autonomous vehicle 102; navigate between predicted locations of these lane markers; and populate the representation of the field 110 rendered on the interior display with virtual lane markers at these predicted locations to visually indicate the understanding by the autonomous vehicle 102 of lane locations and its intent to navigate within these lanes.

Generally, the autonomous vehicle 102 can leverage data stored in the localization map to continue to operate according to known traffic signs in a geographic region even if these traffic signs are no longer present and to communicate its intent to do so to an occupant, which may reduce confusion, frustration, and or anxiety and increase trust.

As an example of the presently disclosed technology in the context of the mutable object 114, the interfacing system 200 implements autonomous navigation techniques to regularly scan the field 110 around the autonomous vehicle 102, to detect nearby mutable objects 114, and to recalculate its upcoming navigation (in the context of traffic regulations and guidance) based on the type, location, and motion of these nearby objects 114. In one implementation, the interfacing system 200 projects the upcoming trajectory into the representation of the field 110 rendered on the interior display of the presentation system 108, such as in the form of a solid or dashed green line representing the intended path of the autonomous vehicle 102 from its current location. The interfacing system 200 may regularly repeat this process to rescan the nearby field, recalculate a trajectory, and update the representation presented with the presentation system 108 to reflect the updated trajectory.

During the process of calculating the trajectory of the autonomous vehicle 102, the interfacing system 200 may: predict possible trajectories (or sets of possible future locations) of other vehicle, pedestrians, cyclists, and/or other mutable objects nearby; recalculate the autonomous vehicle trajectory based on possible trajectories or future locations of these other objects 114; and indicate these possible trajectories or future locations of these other objects in the representation of the field 114 rendered using the presentation system 108 to communicate to the occupant inside the autonomous vehicle why the autonomous vehicle has elected its current trajectory.

In one implementation, the autonomous vehicle: implements a perception model to identify a type of the mutable object 114 in the field 110 (e.g., a pedestrian, a dog, a bicyclist, a motorcycle, a car, a truck, construction equipment); accesses a motion model for the type of object; leverages recent locations of the object 114 and the selected motion model to estimate a set of possible future locations and/or trajectories of the object 114, such as up to a limited time after the autonomous vehicle 102 is predicted to pass the object 114; define an avoidance boundary around the object 114 and a set of possible future locations of the object 114; and then render an avoidance boundary (e.g., in the form of a bounding box) around the object 114 depicted in the representation, such as in addition to or instead of highlighting the object 114 itself. If the current trajectory of the autonomous vehicle 102 intersects the avoidance boundary, the autonomous vehicle 102 recalculates its trajectory to avoid the avoidance boundary of the object 114 and updates the trajectory rendered with the presentation system 108 accordingly.

By rendering the avoidance boundary around the object 114 and the revised autonomous vehicle trajectory for avoiding the object 114 on the interior display, the interfacing system 200 visually provides the representation link between the object 114 and the revised trajectory currently executed by the autonomous vehicle 102. In particular, the representation link may visually link a speed, lane, direction, or other control operation currently executed by the autonomous vehicle 102 according to the revised trajectory with avoidance of a collision with a possible future location of the object 114.

In one example, the interfacing system 200 detects a pedestrian who has stepped into the road just ahead of the autonomous vehicle 102 and predicts a possible future location of the pedestrian in the path of the autonomous vehicle 102 based on the pedestrian's current location and a pedestrian motion model that predicts a high variability of speed and direction of pedestrians. Accordingly, the interfacing system 200: calculates a revised trajectory; brakes rapidly according to this revised trajectory to avoid an avoidance boundary around the pedestrian; and simultaneously highlights the pedestrian, highlights the avoidance boundary around the pedestrian (e.g., with a flashing red bounding box), and projects the updated trajectory in the representation of the field 110 rendered on the interior display. The interfacing system 200 may also: render a representation link in the form of a notification linking the braking action to the pedestrian on the interior display, thereby communicating the nature of the braking action in real-time to the occupant.

In another example, the interfacing system 200 detects a vehicle turning into the travel path 104 of the autonomous vehicle in a lane just ahead of the autonomous vehicle 102 and predicts a possible future location of this vehicle based on the vehicle's current location and a road vehicle motion model that predicts a lower variability of speed and direction of road vehicles. Accordingly, the interfacing system 200: rapidly verifies an open lane to the left side; calculates a revised trajectory to move the autonomous vehicle 102 one lane to the left; rapidly veers left into this lane according to this revised trajectory to avoid an avoidance boundary around the vehicle; and simultaneously highlights the vehicle, highlights the avoidance boundary around the vehicle, and projects the updated trajectory in the representation of the field rendered on the interior display. The interfacing system 200 renders a representation link correlating the braking action to the vehicle moving into the travel path 104 on the interior display. For example, while navigating around the vehicle, the interfacing system 200 can render various representation links on the interior display: the original trajectory of the autonomous vehicle; a bounding box containing predicted locations of the vehicle as the autonomous vehicle approaches; the revised trajectory of the autonomous vehicle 102 to avoid collision with the vehicle; and a prompt or notification highlighting a section of the revised trajectory to avoid (e.g., swerve around) the vehicle. Furthermore, the interfacing system 200 can replay a sequence of optical images (e.g., a five-second color video) recorded by the interfacing system 200 just before and during the lane change to avoid the vehicle on the interior display, such as automatically or responsive to manual selection to review this replay from the user.

The interfacing system 200 can regularly repeat such steps for mutable objects 114 to recalculate an avoidance boundary around the mutable objects 114, revise the autonomous vehicle trajectory, and update the representation to reflect these changes, such as at a rate of 10 Hz, to provide real-time feedback to the occupant regarding the intent and control operations of the autonomous vehicle 102 in the context of object types, proximities, and trajectories near the autonomous vehicle 102. Such steps may be concurrently or separately executed for multiple objects in the field 110 near the autonomous vehicle 102.

For various immutable objects 112, the interfacing system 200 may take different approaches depending on the nature of the immutable object 112 in the field 110. For example, in the context of traffic signs, the interfacing system 200 detects traffic signs in the field 110 near the autonomous vehicle 102 and to highlights the traffic signs in the representation of the field 110 rendered with the presentation system 108, such as on the interior display. For example, in one implementation the interfacing system 200 implements the perception model, the navigation model, computer vision, and/or artificial intelligence techniques to: detect the traffic sign in the field 110 around the autonomous vehicle 102; interpret traffic regulations, (e.g., navigation or path planning regulations, rules, laws, prompt, guidance, social constructions, etc.) from the traffic sign; link traffic regulation with a portion of the travel path 104 (e.g., particular geospatial location, such as a speed bump, or with a segment of road nearby, such as a merge lane following a yield traffic sign or a school zone following a school zone sign; modify the autonomous vehicle trajectory or execute another control operation at the portion of the travel path 104 accordingly; and update the representation to reflect the perception of the surrounding field 110, the traffic sign, and the intended control operation executed by the autonomous vehicle 102 using one or more representation links.

In one implementation, once the interfacing system 200 detects the traffic sign in the field 110 ahead of the autonomous vehicle 102, the interfacing system 200: validate the traffic regulation corresponding to the traffic sign based on other features or objects detected nearby; annotate or highlight the traffic sign and related objects in the representation of the field 110 rendered with the presentation system 108; populate the traffic sign and warning window on the representation with an icon representing the traffic sign; modify the speed, lane, navigation, or path planning of the autonomous vehicle 102 according to the traffic sign (e.g., by slowing for a bump or for a school zone, by yielding to merging traffic, by changing lanes to avoid an upcoming construction zone); and simultaneously (or preemptively) presenting the representation link between the control operation and the traffic sign in the representation.

In one particular example where the immutable object 112 is a speed limit sign, the interfacing system 200 detects a speed limit sign adjacent the segment of road currently occupied by the autonomous vehicle 102; highlights the speed limit sign in the representation of the field 110 rendered on the interior display; and populates the traffic sign and warning window on the interior display with an icon representing the speed limit read from the traffic sign. The autonomous vehicle 102 can preserve this speed limit icon in the traffic sign and warning window on the interior display until the autonomous vehicle 102 detects a speed limit sign indicating a different speed.

In another particular example, where the immutable object 112 is a speed bump sign, upon detecting the speed bump sign, the interfacing system 200: predicts a location of a speed bump ahead based on the location of the traffic sign and/or detect the speed bump directly in scan data recorded by the interfacing system 200 while approaching the speed bump sign; highlights the speed bump in the representation of the field rendered on the interior display; populates the traffic sign and warning window on the interior display with an icon representing the speed bump sign; and slows for the upcoming bump. To further link this control operation (i.e., braking) to the speed bump sign, the interfacing system 200 can also render a notification including "slowing for upcoming speed bump" on the interior display as the autonomous vehicle 102 slows for the upcoming speed bump. The interfacing system 200 further: determines that the autonomous vehicle 102 has passed the speed bump based on an output of an accelerator or IMU in the autonomous vehicle 102 or responsive to passing the speed bump sign; and removes the icon representing the speed bump sign from the traffic sign and warning window on the interior display accordingly.

In another particular example, where the immutable object 112 is a school zone related sign, such as a sign stating "SCHOOL ZONE" or "25 MPH WHEN CHILDREN PRESENT." Upon detecting this school zone sign, the interfacing system 200: scans the field 110 around the autonomous vehicle 102 for a pedestrian (e.g., any pedestrian, a pedestrian under a threshold height, etc.); highlights the sign in the representation of the field rendered on the interior display; and populates the sign and warning window on the interior display with an icon representing the school zone sign. If the interfacing system 200 does not detect a pedestrian, the interfacing system 200 may: mute the school zone icon rendered on the interior display; render a notification including "no children present" on the interior display; and continue to navigate at its current speed.

On the other hand, if the interfacing system 200 does detect a pedestrian nearby, the interfacing system 200: slows to the speed indicated on the school zone sign; highlights the pedestrian in the representation of the field 110 rendered on the interior display; and emphasizes the school zone icon rendered on the interior display or otherwise indicates that the restriction indicated by the school zone sign is currently valid on the interior display. The interfacing system 200 may also render a notification that the autonomous vehicle 102 is slowing through the school zone on the interior display to link the speed reduction to both the school zone sign and the pedestrian(s) detected nearby. For example, the interfacing system 200 may render—on the interior display—"We're in a school zone, and I see children. I'm slowing down until we pass this school."

Additionally or alternatively, the localization map stored in local memory on the autonomous vehicle can include a layer indicating georeferenced school zones within the geographic region, and the interfacing system 200 may query the localization map for proximity to a school zone. For example, upon confirming the proximity to a school zone of the autonomous vehicle 102 based on the localization map, the interfacing system 200 may: scan the field 110 around the autonomous vehicle 102 for a school zone sign; highlight the school zone sign in the representation of the field 110 rendered on the interior display; populate the traffic sign and warning window rendered on the interior display with a virtual icon indicating proximity to the school zone; scan the field 110 around the autonomous vehicle 102 for a pedestrian; indicate that the school zone sign and/or a regulation for active school zones is valid on the interior display responsive to detecting a pedestrian; and then modify the speed, autonomous navigation, path planning, and/or other control operation, accordingly.

As the autonomous vehicle 102 navigates through the school zone at reduced speed, the interfacing system 200 continues to scan the field 110 for an indicator that the autonomous vehicle 102 has passed the school zone and/or that the navigational regulation linked to the school zone (e.g., indicated by the school zone sign) is no longer valid. For example, the interfacing system 200 may scan the field 110 around the autonomous vehicle 102 for a change in topography (e.g., presence of houses or retail structures facing the road rather than school buildings) that may indicate that the autonomous vehicle 102 has exited the school zone. In another example, the interfacing system 200 can: continue to scan the field 110 around the autonomous vehicle 102 for pedestrians as the autonomous vehicle 102 passes through the school zone; and determine that the traffic sign is no longer valid if the autonomous vehicle 102 has moved more than a threshold distance (e.g., 50 meters) from a last detected pedestrian. Additionally or alternatively, the interfacing system 200 can query the localization map for a georeferenced boundary of the school zone and confirm that the traffic regulation linked to the school zone is no longer valid for the autonomous vehicle 102 once the geospatial location of the autonomous vehicle 102 falls outside of the georeferenced boundary of the school zone. Once the interfacing system 200 thus determines that the traffic regulation linked to the school zone is no longer valid, such as due to absence of pedestrians near the autonomous vehicle 102 or responsive to exit from the school zone, the autonomous vehicle 102 resumes navigation up to the speed limit posted on the road segment of the travel path 104.

In another particular example, the immutable object 112 defines a construction zone. The interfacing system 200 detects a sequence of construction cones defining a construction zone and a construction zone sign that states "CONSTRUCTION ZONE 55 MPH." Responsive to detecting this construction sign, the interfacing system 200 scans the field 110 around the construction zone for construction workers and moving construction equipment. If the interfacing system 200 does not detect a worker or moving construction equipment within the construction zone, the interfacing system 200: highlights the construction zone and construction sign within the representation of the field 110 rendered on the interior display; populates the traffic sign and warning window on the interior display with a muted icon representing the construction zone; indicates that the construction sign is not currently valid due to absence of construction workers on the interior display; and maintains its current speed accordingly.

On the other hand, if the interfacing system 200 does detect a construction worker or moving construction equipment within or near the construction zone, the interfacing system 200: highlights the construction zones, construction workers, and/or construction equipment in the field 110 rendered on the interior display; emphasizes the construction zone icon rendered in the traffic sign and warning window on the interior display; and indicates that the autonomous vehicle 102 has entered a construction zone on the interior display as the autonomous vehicle 102 slows to the posted speed within the construction zone. The autonomous vehicle 102 can then resume the posted speed for the road once the autonomous vehicle 102 passes the construction zone, for example determined by absence of construction cones in the field 110 ahead of the autonomous vehicle 102.

In another particular example, the immutable object 112 defines a road area that may be hazardous under certain weather conditions. For example, the interfacing system 200 detects a sign stating "SLIPPERY WHEN WET"; detects moisture on the nearby road surface of the travel path 104 or verifies a local weather condition within a weather database; selectively decreases the speed of the autonomous vehicle 102 responsive to both presence of the traffic sign and moisture on the road surface; and indicates the traffic sign, the related road condition, and the autonomous decision to reduce speed based on the traffic sign and road condition on the interior display.

Figure 3:
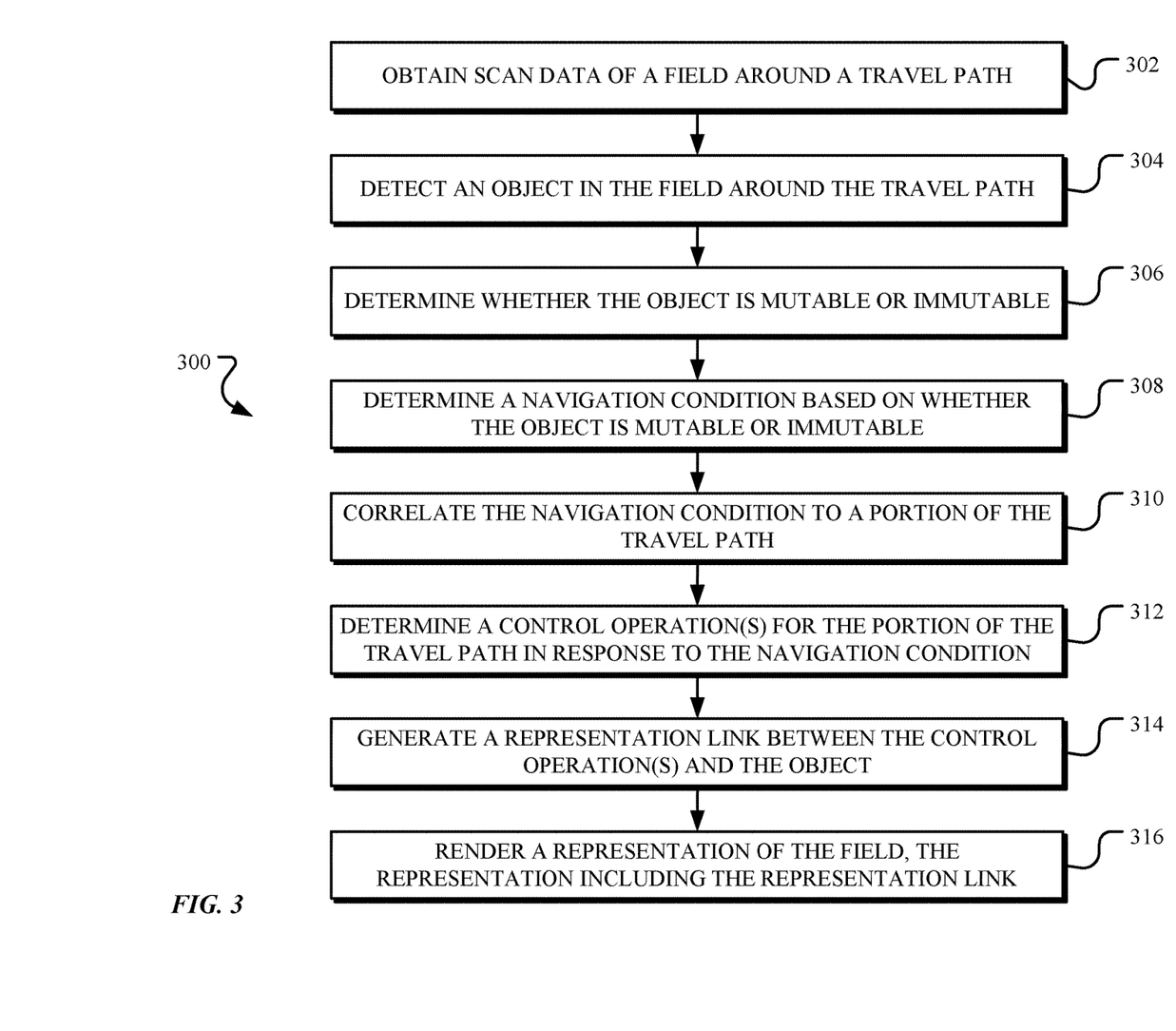
FIG. 3 illustrates example operations for communicating an intent of an autonomous vehicle to an occupant of the autonomous vehicle.

Turning to FIG. 3, example operations 300 for communicating an intent of an autonomous vehicle to an occupant of the autonomous vehicle are illustrated. In one implementation, an operation 302 obtains scan data of a field around a travel path along a route of an autonomous vehicle. The scan data is captured using at least one sensor, which may be part of a sensory system deployed in the autonomous vehicle. An operation 304 detects an object in the field around the travel path from the scan data, and an operation 306 determines whether the object is a mutable object or an immutable object. In one implementation, the object is determined to be the mutable object or the immutable object based on an object type and a motion of the object. The immutable object may be a sign, a light, a traffic cone, a stationary traffic object, and/or the like, and the mutable object may be an animal, a person, a vehicle, or another moving object.

An operation 308 determines a navigation condition associated with the object based on whether the object is the mutable object or the immutable object. In one implementation, when the object is the immutable object, the operation 308 determines the navigation condition by extracting traffic regulation data from the scan data and correlating the traffic regulation data with a known traffic regulation. The traffic regulation data may include numbers, words, symbols, and/or the like. The known traffic regulation may be associated with at least one vehicle control parameter. The vehicle control parameter(s) may include reduce speed, increase speed, stop, yield, merge, and/or the like.

The known traffic regulation may include, without limitation, one or more traffic rules associated with a speed limit, a yield sign, a school zone, a road condition, a stop sign, a traffic light, a merge lane, a construction zone, a one way, a cross walk, and/or the like. The road condition includes, without limitation, a speed bump, a speed dip, a weather condition warning, a low clearance, and/or other conditions of the road or features of the travel route that will affect navigation or operation of the autonomous vehicle.

In one implementation, when the object is the mutable object, the operation 308 determines the navigation condition by determining a set possible trajectories of the object and determining whether any trajectory in the set of possible trajectories will intersect the travel path of the autonomous vehicle. The set of possible trajectories may be determined by identifying an object type of the mutable object and identifying a motion model for the object type. The set of possible trajectories may be determined based on the motion model and one or more locations of the object.

An operation 310 correlates the navigation condition to a portion of the travel path. For example, the navigation condition may be correlated to the portion of the travel path based on the set of possible trajectories for the mutable object. The navigation condition may be correlated to the portion of the travel path based on a localization map, the scan data, and/or other localization data. An operation 312 determines at least one control operation of the autonomous vehicle for the portion of the travel path in response to the navigation condition. In one implementation, the control operation(s) are determined based on the vehicle control parameter(s) in a context of the portion of the travel path. The control operation(s) is further based current weather conditions when the road condition includes the weather condition warning.

An operation 314 generates a representation link between the control operation(s) of the autonomous vehicle and the object, and an operation 316 rendering a representation of the field around the travel path. The representation includes the representation link between the control operation(s) and the object. The representation link may include color coding, a bounding box, highlighting, and/or other visual, audial, or tactile features to link the control operation(s) to the object. The representation is presented to an interior of the autonomous vehicle using a presentation system, which may be mounted in or otherwise deployed in the interior of the autonomous vehicle or be part of a mobile device. Following or otherwise in connection with the presentation of the representation, the control operation(s) of the autonomous vehicle may be autonomously executed for the portion of the travel path. The representation link may be removed from the representation of the field following the autonomous execution of the at least one control operation by the autonomous vehicle.

Figure 4:
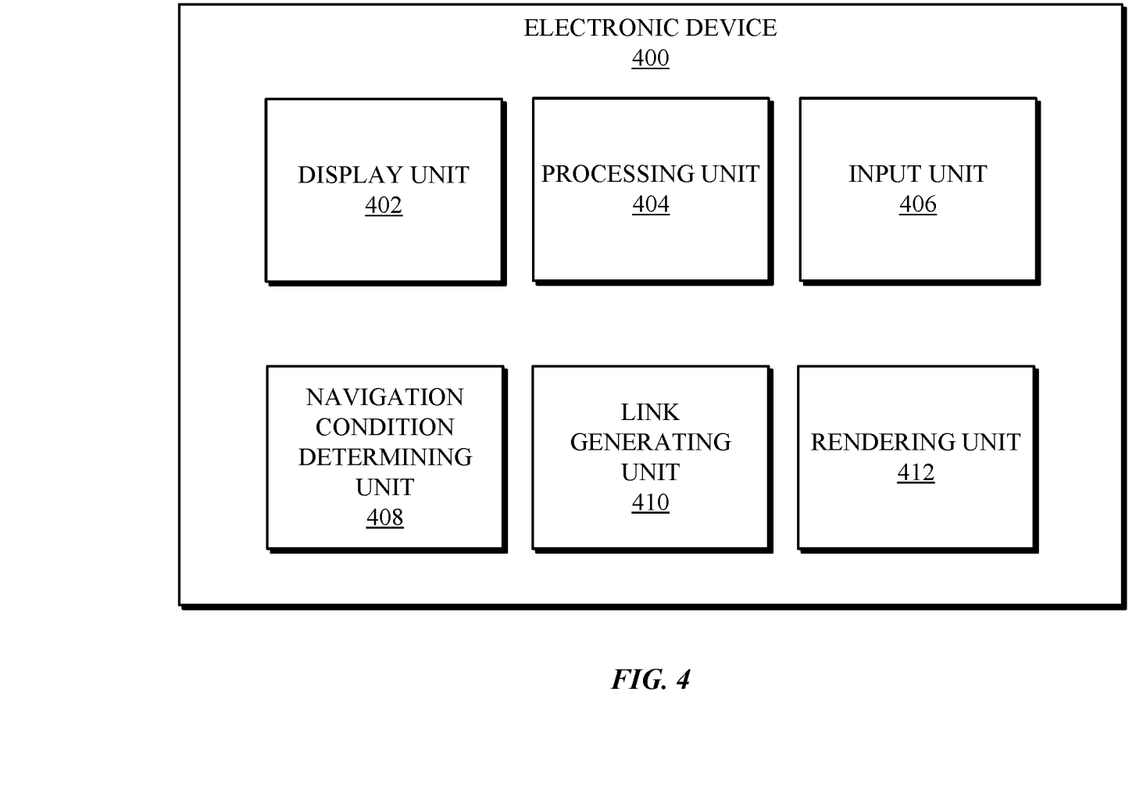
FIG. 4 is a functional block diagram of an electronic device including operational units arranged to perform various operations of the presently disclosed technology.

Turning to FIG. 4, an electronic device 400 including operational units 402-412 arranged to perform various operations of the presently disclosed technology is shown. The operational units 402-412 of the device 400 are implemented by hardware or a combination of hardware and software to carry out the principles of the present disclosure. It will be understood by persons of skill in the art that the operational units 402-412 described in FIG. 4 may be combined or separated into sub-blocks to implement the principles of the present disclosure. Therefore, the description herein supports any possible combination or separation or further definition of the operational units 402-412.

In one implementation, the electronic device 400 includes a display unit 402 configured to display information, such as a graphical user interface, and a processing unit 404 in communication with the display unit 402 and an input unit 406 configured to receive data from one or more input devices or systems. Various operations described herein may be implemented by the processing unit 404 using data received by the input unit 406 to output information for display using the display unit 402.

Additionally, in one implementation, the electronic device 400 includes units implementing the operations described with respect to FIG. 3. For example, the operations 308 and/or 310 may be implemented by a navigation condition determining unit 408, and the operations 312 and/or 314 may be implemented by a link generation unit 410, which each may include other units implementing each operation. The operation 316 may be implemented by a rendering unit 412. In some implementations, a controlling unit implements various operations for controlling the operation of a vehicle based on the operations implemented by the other units.

Figure 5:
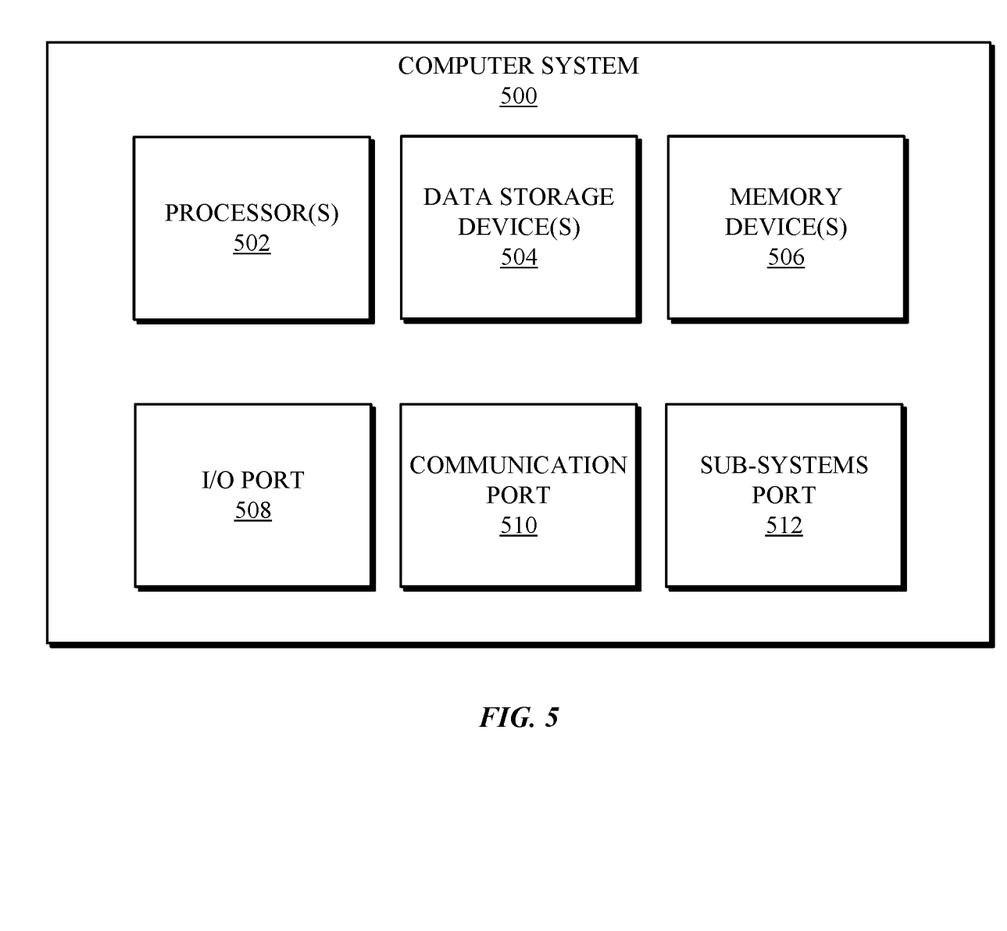
FIG. 5 is an example computing system that may implement various aspects of the presently disclosed technology.

Referring to FIG. 5, a detailed description of an example computing system 500 having one or more computing units that may implement various systems and methods discussed herein is provided. The computing system 500 may be applicable to the measuring system 102 and other computing or network devices. It will be appreciated that specific implementations of these devices may be of differing possible specific computing architectures not all of which are specifically discussed herein but will be understood by those of ordinary skill in the art.

The computer system 500 may be a computing system is capable of executing a computer program product to execute a computer process. Data and program files may be input to the computer system 500, which reads the files and executes the programs therein. Some of the elements of the computer system 500 are shown in FIG. 5, including one or more hardware processors 502, one or more data storage devices 504, one or more memory devices 506, and/or one or more ports 508-512. Additionally, other elements that will be recognized by those skilled in the art may be included in the computing system 500 but are not explicitly depicted in FIG. 5 or discussed further herein. Various elements of the computer system 500 may communicate with one another by way of one or more communication buses, point-to-point communication paths, or other communication means not explicitly depicted in FIG. 5.

The processor 502 may include, for example, a central processing unit (CPU), a microprocessor, a microcontroller, a digital signal processor (DSP), and/or one or more internal levels of cache. There may be one or more processors 502, such that the processor 502 comprises a single central-processing unit, or a plurality of processing units capable of executing instructions and performing operations in parallel with each other, commonly referred to as a parallel processing environment.

The computer system 500 may be a conventional computer, a distributed computer, or any other type of computer, such as one or more external computers made available via a cloud computing architecture. The presently described technology is optionally implemented in software stored on the data stored device(s) 504, stored on the memory device(s) 506, and/or communicated via one or more of the ports 508-512, thereby transforming the computer system 500 in FIG. 5 to a special purpose machine for implementing the operations described herein. Examples of the computer system 500 include personal computers, terminals, workstations, mobile phones, tablets, laptops, personal computers, multimedia consoles, gaming consoles, set top boxes, and the like.

The one or more data storage devices 504 may include any non-volatile data storage device capable of storing data generated or employed within the computing system 500, such as computer executable instructions for performing a computer process, which may include instructions of both application programs and an operating system (OS) that manages the various components of the computing system 500. The data storage devices 504 may include, without limitation, magnetic disk drives, optical disk drives, solid state drives (SSDs), flash drives, and the like. The data storage devices 504 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 506 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 504 and/or the memory devices 506, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 500 includes one or more ports, such as an input/output (I/O) port 508, a communication port 510, and a sub-systems port 512, for communicating with other computing, network, or vehicle devices. It will be appreciated that the ports 508-512 may be combined or separate and that more or fewer ports may be included in the computer system 500.

The I/O port 508 may be connected to an I/O device, or other device, by which information is input to or output from the computing system 500. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 500 via the I/O port 508. Similarly, the output devices may convert electrical signals received from computing system 500 via the I/O port 508 into signals that may be sensed as output by a human, such as sound, light, and/or touch. The input device may be an alphanumeric input device, including alphanumeric and other keys for communicating information and/or command selections to the processor 502 via the I/O port 508. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing system 500 via the I/O port 508. For example, an electrical signal generated within the computing system 500 may be converted to another type of signal, and/or vice-versa. In one implementation, the environment transducer devices sense characteristics or aspects of an environment local to or remote from the computing device 500, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the example computing device 500, such as, physical movement of some object (e.g., a mechanical actuator), heating or cooling of a substance, adding a chemical substance, and/or the like.

In one implementation, a communication port 510 is connected to a network by way of which the computer system 500 may receive network data useful in executing the methods and systems set out herein as well as transmitting information and network configuration changes determined thereby. Stated differently, the communication port 510 connects the computer system 500 to one or more communication interface devices configured to transmit and/or receive information between the computing system 500 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 510 to communicate one or more other machines, either directly over a point-to-point communication path, over a wide area network (WAN) (e.g., the Internet), over a local area network (LAN), over a cellular (e.g., third generation (3G), fourth generation (4G) network, or fifth generation (5G)), or over another communication means. Further, the communication port 510 may communicate with an antenna for electromagnetic signal transmission and/or reception. In some examples, an antenna may be employed to receive Global Positioning System (GPS) data to facilitate determination of a location of a machine, vehicle, or another device.

The computer system 500 may include a sub-systems port 512 for communicating with one or more systems related to a vehicle to control an operation of the vehicle and/or exchange information between the computer system 500 and one or more sub-systems of the vehicle. Examples of such sub-systems of a vehicle, include, without limitation, imaging systems, radar, lidar, motor controllers and systems, battery control, fuel cell or other energy storage systems or controls in the case of such vehicles with hybrid or electric motor systems, autonomous or semi-autonomous processors and controllers, steering systems, brake systems, light systems, navigation systems, environment controls, entertainment systems, and the like.

In an example implementation, navigation condition information, representation information, and software and other modules and services may be embodied by instructions stored on the data storage devices 504 and/or the memory devices 506 and executed by the processor 502. The computer system 500 may be integrated with or otherwise form part of a vehicle. In some instances, the computer system 500 is a portable device that may be in communication and working in conjunction with various systems or sub-systems of a vehicle.

The present disclosure recognizes that the use of such information may be used to the benefit of users. For example, the location information of a vehicle may be used to provide targeted information concerning a "best" path or route to the vehicle and to avoid surface hazards. Accordingly, use of such information enables calculated control of an autonomous vehicle. Further, other uses for location information that benefit a user of the vehicle are also contemplated by the present disclosure.

Users can selectively block use of, or access to, personal data, such as location information. A system incorporating some or all of the technologies described herein can include hardware and/or software that prevents or blocks access to such personal data. For example, the system can allow users to "opt in" or "opt out" of participation in the collection of personal data or portions thereof. Also, users can select not to provide location information, or permit provision of general location information (e.g., a geographic region or zone), but not precise location information.

Entities responsible for the collection, analysis, disclosure, transfer, storage, or other use of such personal data should comply with established privacy policies and/or practices. Such entities should safeguard and secure access to such personal data and ensure that others with access to the personal data also comply. Such entities should implement privacy policies and practices that meet or exceed industry or governmental requirements for maintaining the privacy and security of personal data. For example, an entity should collect users' personal data for legitimate and reasonable uses and not share or sell the data outside of those legitimate uses. Such collection should occur only after receiving the users' informed consent. Furthermore, third parties can evaluate these entities to certify their adherence to established privacy policies and practices.

The system set forth in FIG. 5 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

While the present disclosure has been described with reference to various implementations, it will be understood that these implementations are illustrative and that the scope of the present disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method of communicating an intent of an autonomous vehicle to an occupant of the autonomous vehicle, the method comprising:
   navigating the autonomous vehicle autonomously along a route, the autonomous vehicle moving on a travel path along the route;
   obtaining scan data of a field around the travel path, the scan data captured using at least one sensor deployed in the autonomous vehicle;
   detecting an object in the field around the travel path from the scan data;
   determining whether the object is a mutable object or an immutable object;
   determining a navigation condition associated with the object based on whether the object is the mutable object or the immutable object;
   correlating the navigation condition to a portion of the travel path;
   determining at least one control operation of the autonomous vehicle for the portion of the travel path in response to the navigation condition;
   generating a representation link between the at least one control operation of the autonomous vehicle and the object;
   rendering a representation of the field around the travel path, the representation including the representation link between the at least one control operation and the object, the representation presented to the occupant of the autonomous vehicle using a presentation system; and
   autonomously executing the at least one control operation of the autonomous vehicle for the portion of the travel path.

2. The method of claim 1, wherein the representation link is removed from the representation of the field following autonomous execution of the at least one control operation by the autonomous vehicle.

3. The method of claim 1, wherein the navigation condition is determined by:
   extracting traffic regulation data from the scan data when the object is the immutable object; and
   correlating the traffic regulation data with a known traffic regulation, the known traffic regulation being associated with at least one vehicle control parameter, the at least one control operation determined based on the at least one vehicle control parameter in a context of the portion of the travel path.

4. The method of claim 3, wherein the known traffic regulation includes one or more traffic rules associated with one or more of: a speed limit, a yield sign, a school zone, a road condition, a stop sign, a traffic light, a merge lane, a construction zone, a one way, and a cross walk.

5. The method of claim 4, wherein the road condition includes one or more of a speed bump, a speed dip, a weather condition warning, and a low clearance.

6. The method of claim 5, wherein the at least one control operation is further based current weather conditions when the road condition includes the weather condition warning.

7. The method of claim 3, wherein the traffic regulation data includes one or more of numbers, words, and symbols.

8. The method of claim 3, wherein the at least one vehicle control parameter includes one or more of reduce speed, increase speed, stop, yield, and merge.

9. The method of claim 1, wherein the immutable object is at least one of a sign, a light, a traffic cone, or a stationary traffic object; and the mutable object is at least one of an animal, a person, a vehicle, or a moving object.

10. The method of claim 1, wherein the navigation condition is determined by:
   determining a set possible trajectories of the object when the object is a mutable object; and
   determining whether any trajectory in the set of possible trajectories will intersect the travel path of the autonomous vehicle.

11. The method of claim 10, wherein determining the set of possible trajectories includes:
   identifying an object type of the mutable object; and
   identifying a motion model for the object type, the set of possible trajectories determined based on the motion model and one or more locations of the object.

12. The method of claim 10, wherein the navigation condition is correlated to the portion of the travel path based on the set of possible trajectories.

13. The method of claim 1, wherein the navigation condition is correlated to the portion of the travel path based on a localization map.

14. The method of claim 1, wherein the representation link includes at least one of color coding, a bounding box, or highlighting.

15. The method of claim 1, wherein the object is determined to be the mutable object or the immutable object based on an object type and a motion of the object.

16. One or more tangible non-transitory computer-readable storage media storing computer-executable instructions for performing a computer process on a computing system, the computer process comprising:
   obtaining scan data of a field around a travel path along a route of an autonomous vehicle, the scan data captured using at least one sensor;
   detecting an object in the field around the travel path from the scan data;
   determining whether the object is a mutable object or an immutable object;
   determining a navigation condition associated with the object based on whether the object is the mutable object or the immutable object;
   correlating the navigation condition to a portion of the travel path;
   determining at least one control operation of the autonomous vehicle for the portion of the travel path in response to the navigation condition;
   generating a representation link between the at least one control operation of the autonomous vehicle and the object; and
   rendering a representation of the field around the travel path, the representation including the representation link between the at least one control operation and the object, the representation presented to an interior of the autonomous vehicle using a presentation system.

17. The one or more tangible non-transitory computer-readable storage media of claim 16, wherein the navigation condition is determined by:
   extracting traffic regulation data from the scan data when the object is the immutable object; and
   correlating the traffic regulation data with a known traffic regulation, the known traffic regulation being associated with at least one vehicle control parameter, the at least one control operation determined based on the at least one vehicle control parameter in a context of the portion of the travel path.

18. The one or more tangible non-transitory computer-readable storage media of claim 16, wherein the navigation condition is determined by:
   determining a set possible trajectories of the object when the object is a mutable object; and
   determining whether any trajectory in the set of possible trajectories will intersect the travel path of the autonomous vehicle.

19. A system of communicating an intent of an autonomous vehicle to an occupant of the autonomous vehicle, the system comprising:
   a sensor system deployed in the autonomous vehicle, the sensor system having at least one sensor capturing scan data of a field around a travel path along a route of an autonomous vehicle;
   a vehicle controller in communication with the sensor system, the vehicle controller configured to determine a navigation condition associated with an object detected in the field around the travel path, the navigation condition determined based on whether the object is a mutable object or an immutable object and correlated to a portion of the travel path, the vehicle controller configured to determine at least one control operation of the autonomous vehicle for the portion of the travel path in response to the navigation condition; and
   a presentation system in communication with the vehicle controller, the presentation system configured to present a representation of the field around the travel path to the occupant of the autonomous vehicle, the representation including a representation link between the at least one control operation and the object.

20. The system of claim 19, wherein the presentation system includes a display of a mobile device or mounted in the autonomous vehicle.

* * * * *